Sept. 22, 1959
D. H. ZWIGHT
2,905,262
MAST CONTROL AND DECK LEVELING MEANS FOR
VEHICLE SUPPORTED MAST STRUCTURE
Filed July 20, 1955
3 Sheets-Sheet 1
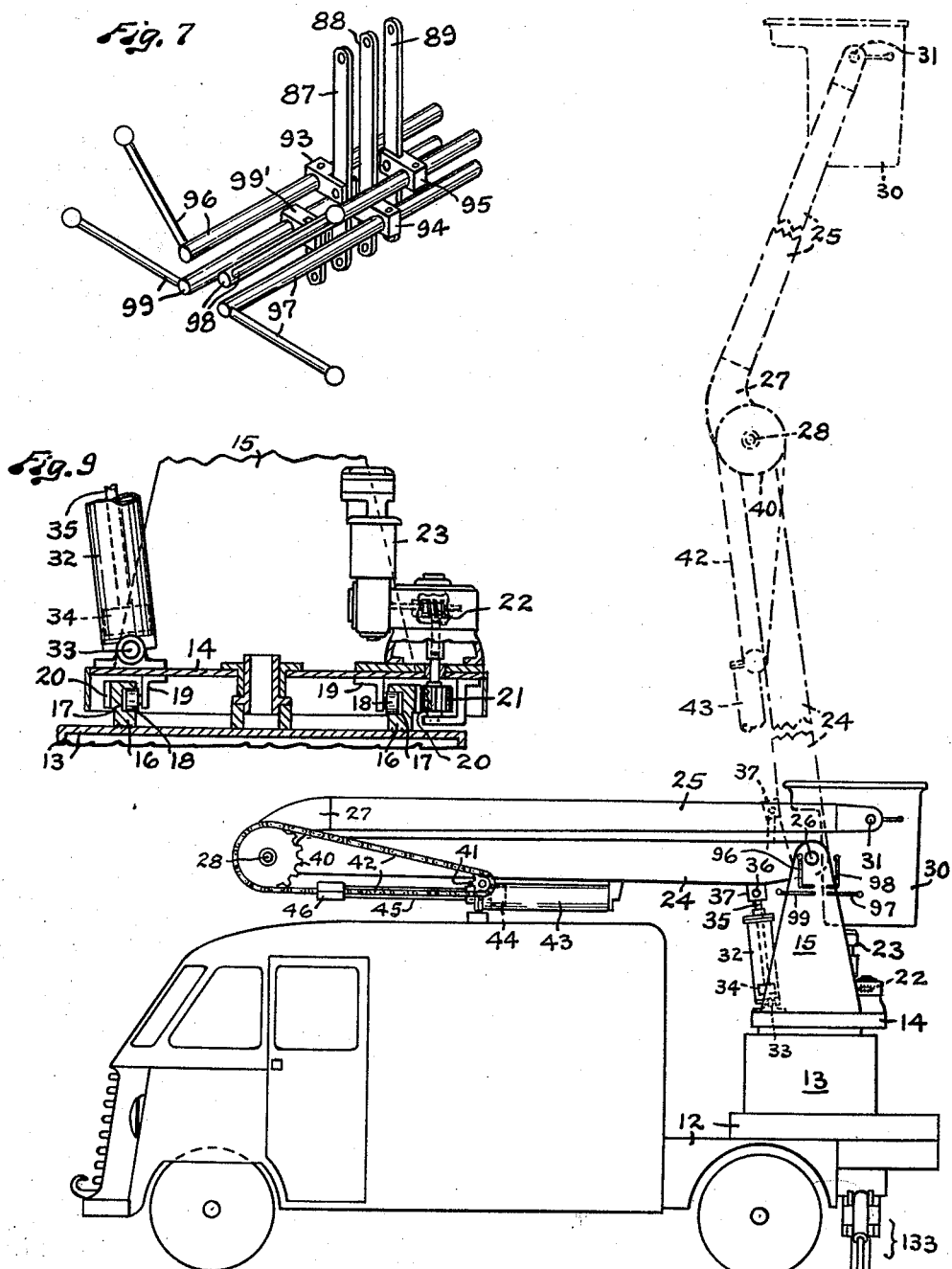
INVENTOR.
Daniel H. Zwight
BY
Fred C. Matheny
ATTORNEY

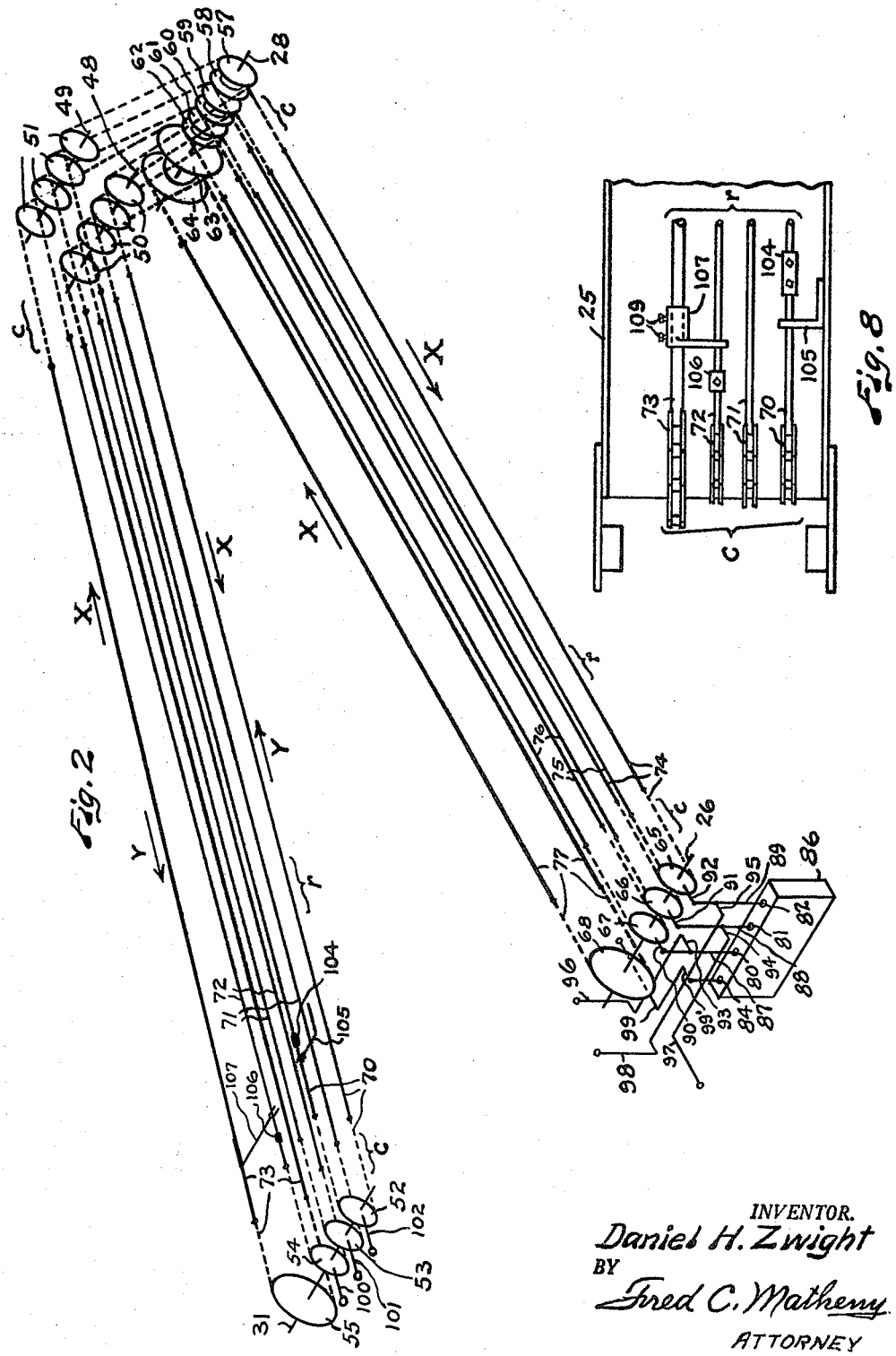

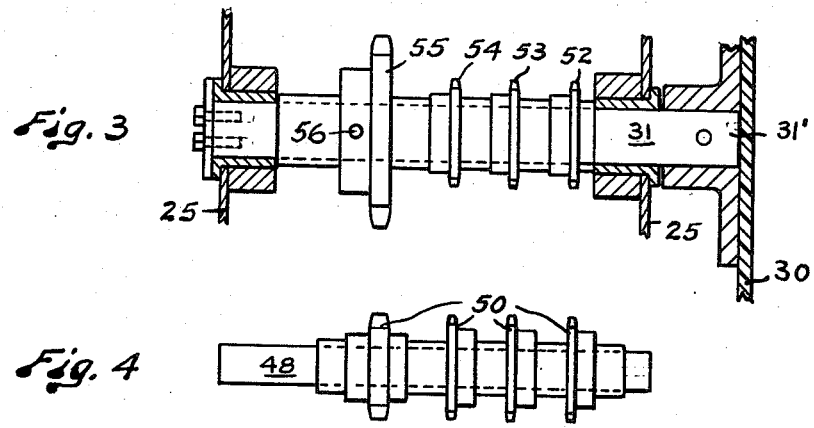
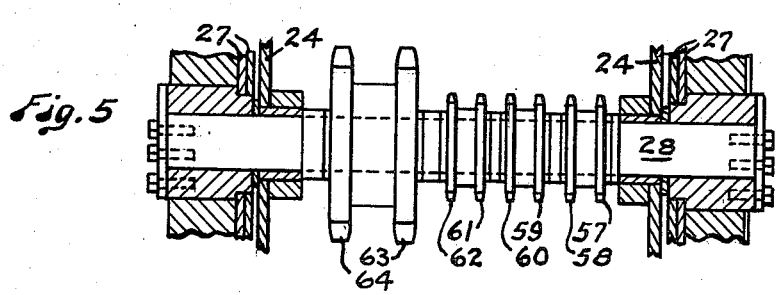
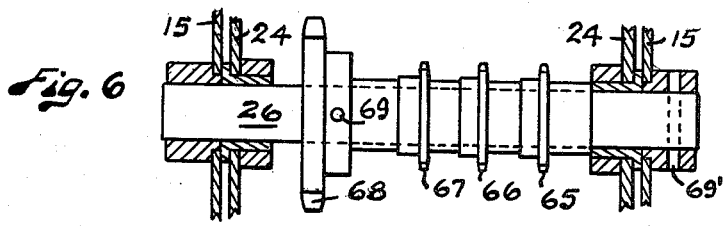
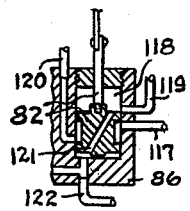
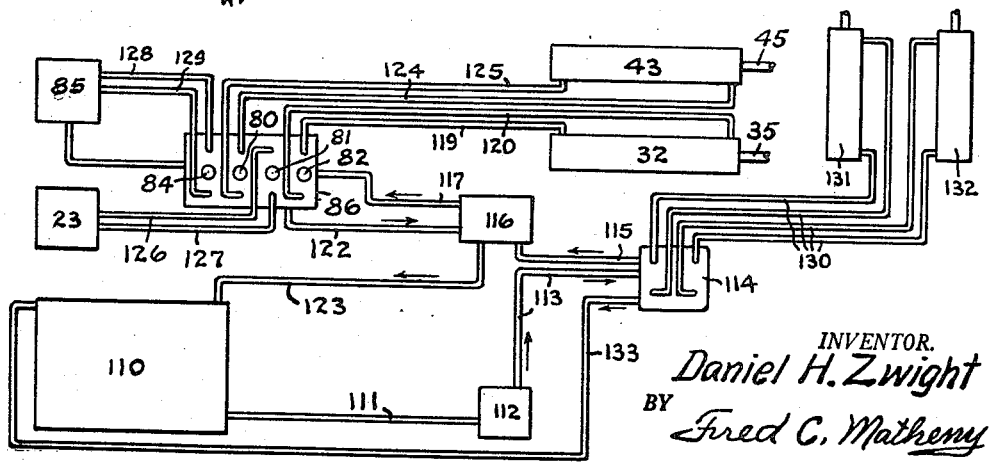

United States Patent Office 2,905,262
Patented Sept. 22, 1959

1

2,905,262

MAST CONTROL AND DECK LEVELING MEANS FOR VEHICLE SUPPORTED MAST STRUCTURE

Daniel H. Zwight, Leavenworth, Wash.

Application July 20, 1955, Serial No. 523,277

6 Claims. (Cl. 182—136)

This invention relates to mast control and deck leveling means for a vehicle supported mobile mast structure of the type disclosed in Patent No. 2,616,768, issued November 4, 1952.

An object of this invention is to provide efficient control means for use in a structure in which a self leveling deck or cage capable of supporting at least one person in an elevated position, is mounted on a movable mast formed of at least two mast sections pivotally connected with each other in jack knife fashion and rotatively mounted on a motor vehicle so that the deck or cage can be moved vertically and horizontally within the limits provided by the length and zone of movement of the mast to properly position a person relative to work to be done.

Another object is to provide deck or cage supporting multiple section mast means having hydraulic mast moving devices which are provided with manually operated control valves and are further provided with limit or safety means preventing manual operation of said control valves when the mast sections are in certain predetermined positions.

Another object of this invention is to provide, in truck supported mast and deck or cage means of this type, safety devices which are actuated by pivotal movement of the mast sections and which will prevent the mast sections from being moved into a position in which there is danger of tipping the truck over.

Other objects of this invention will be apparent from the following description taken in connection with the accompanying drawings.

Figure 1 is a view in side elevation of a truck supported mast structure constructed in accordance with this invention showing the mast structure by full lines in a folded or inoperative position and by dot and dash lines in an extended or operative position.

Fig. 2 is a detached schematic perspective view showing control and limiting means associated with this machine, the masts being omitted and the showing in Fig. 2 being from the side of the machine opposite to the side shown in Fig. 1.

Fig. 3 is a detached view on a larger scale than Fig. 1, with parts in plan and parts in section showing a bearing shaft with sprocket wheels thereon and which is mounted in the upper end portion of the upper mast and supports a deck or cage.

Fig. 4 is a view similar to Fig. 3 showing a jack shaft with sprocket wheels mounted thereon.

Fig. 5 is a view similar to Figs. 3 and 4 showing a bearing shaft carrying sprocket wheels and which connects the lower end of the upper mast and the upper end of the lower mast.

Fig. 6 is a view similar to Figs. 3, 4 and 5 showing a bearing shaft carrying sprocket wheels and which is mounted in a frame and pivotally supports the lower end portion of the lower mast.

Fig. 7 is a detached isometric view of parts of the control means.

2

Fig. 8 is a detached fragmentary plan view of the upper end portion of the upper mast and automatic control and limiting means carried thereby.

Fig. 9 is a fragmentary view, partly in section and partly in elevation, showing mast mounting turntable means.

Fig. 10 is a hydraulic diagram illustrating operating and control means for this device.

Fig. 11 is a fragmentary sectional view illustrating part of a multiple valve shown in Figs. 2 and 10.

Like reference numerals designate like parts throughout the several views.

This mast and deck structure is mounted on the rear end portion of a truck 12. Said structure comprises a base or turret 13 rigid with the truck frame, a turntable portion 14 rotatable relative to the base portion 13 and two spaced apart upright side frame members 15 rigid with the turntable 14. The mast structure is supported by the frame members 15, as hereinafter explained and is rotatively movable with the turntable 14.

The means herein disclosed for mounting and providing rotation of the turntable 14 is shown in Fig. 9 and comprises a combined circular track and gear member 16 rigid with the fixed base 13 and having an internal annular track 17 receiving rollers 18 which are connected with the turntable 14 by brackets 19. The track and gear 16 has external gear teeth 20 which are engaged by a pinion 21. The pinion 21 is supported by the turntable 14 and is connected by double reduction, self locking, worm gear type, speed reducing gear means 22 with a reversible hydraulic motor 23. This worm type reduction gear 22 functions as a brake, preventing rotary movement of the turntable by gravity on inclines or by turning force applied to the masts.

The mast structure comprises a lower hollow mast 24 and an upper or outer hollow mast 25, hereinafter called an upper mast. The lower end of the lower mast 24 is positioned between the frame plates 15, Figs. 1, 6 and 9, and is pivotally supported from these plates 15 by a lower horizontal pivot shaft 26. The upper end of the lower mast 24 is pivotally connected with a curved lower end part 27 of the upper mast 25 by a medial horizontal pivot shaft 28, Figs. 1 and 5.

An upright workman's cage or deck 30, hereinafter termed a deck, and large enough in size to comfortably receive at least one person, is connected by an upper pivot shaft 31 with the upper end portion of the upper mast.

A double acting hydraulic cylinder 32, Figs. 1, 9 and 10, has its lower end connected by a pivot 33 with turntable 14. A piston 34 in cylinder 32 is connected by a piston rod 35 and pivot member 36 and bracket 37 with lower mast 24. Movement of piston 34 in cylinder 32 pivotally moves lower mast 24 about pivot shaft 26 between an approximately horizontal position shown by full lines, Fig. 1, and an approximately vertical position in which it is shown by dot and dash lines. The upper mast 25 will always be swingingly moved with the lower mast 24 and is swingingly movable relative to the lower mast 24 about the horizontal pivot shaft 28 by means now to be described.

The means for swingingly moving the upper mast 25 about pivot shaft 28 comprises a sprocket wheel 40 rigidly secured to the curved lower end part 27 of the upper mast 25, another sprocket wheel or pinion 41 rotatively mounted on the lower mast 24 at a substantial distance from the sprocket wheel 40 and an endless sprocket chain 42 operatively disposed on the wheels 40 and 41. A double acting hydraulic cylinder 43 is fixedly secured to the lower mast 24 and is provided with a piston 44 which is connected by a piston rod 45 and attachment means 46 with the sprocket chain 42. Movement of the sprocket chain 42 by the cylinder 43 will swingingly move the upper mast 25 about the medial pivot shaft 28. Thus the upper mast 25 may be folded alongside of the lower mast 24 or it can be angularly moved into an infinite number of inclined positions relative to the lower mast 24.

The novel features of this invention relate chiefly to the means for controlling movements of the masts, to the deck leveling means and to the automatic means for limiting the swinging movements of the masts so that said masts can not be moved into an unsafe position in which the weight of the masts and their load might tend to tip the truck over. These control devices include deck leveling means, turntable rotating means, lower mast swing control means and upper mast swing control means. Much of this control mechanism is positioned within the hollow masts and is not visible in Fig. 1 but is somewhat diagrammatically shown detached from the masts in Fig. 2.

The horizontal lower pivot shaft 26 and medial pivot shaft 28 and upper pivot shaft 31 are all diagrammatically shown in Fig. 2 and are more fully illustrated in respective Figs. 6, 5 and 3. These pivot shafts all carry sprocket wheels, as hereinafter described. Two horizontal jack shafts 48 and 49, of duplicate construction, shown diagrammatically in Fig. 2 and one of which jack shafts, namely jack shaft 48, is more fully shown in Fig. 4, are supported by the curved part 27 of the upper mast 25 and are positioned near the medial pivot shaft 28. Four idler sprocket wheels 50 are rotatively mounted on jack shaft 48 and four similar idler sprocket wheels 51 are rotatively mounted on jack shaft 49.

The upper pivot shaft 31, Figs. 2 and 3, has three smaller sprocket wheels 52, 53 and 54 rotatively mounted thereon and has one larger sprocket wheel 55 fixedly and non-rotatively secured thereto, as by a cross pin 56. The deck 30 is fixedly secured to an outwardly protruding end portion 31' of the shaft 31 so that rotary movement of the shaft 31 will be imparted to the deck 30 to keep said deck level and always in a position with its floor horizontal.

The medial pivot shaft 28 has three pairs of smaller sprocket wheels 57—58, 59—60, and 61—62 rotatively mounted thereon and has one pair of larger sprocket wheels 63—64 rotatively mounted thereon. The two sprocket wheels of each of said pairs are rigidly attached together and operate as a unit.

The lower pivot shaft 26 has three smaller sprocket wheels 65, 66 and 67 rotatively mounted thereon and has one larger sprocket wheel 68 fixedly secured thereto as by a cross pin 69. Said lower pivot shaft 26 is non-rotatively secured to frame members 15, as by at least one cross pin 69', Fig. 6.

Four belt type endless connectors 70, 71, 72 and 73 operatively connect the four sprocket wheels 52, 53, 54 and 55 on the upper pivot shaft 31 with four sprocket wheels 57, 59, 61 and 63 respectively on the medial pivot shaft 28.

Four other belt type endless connectors 74, 75, 76 and 77 operatively connect the four sprocket wheels 65, 66, 67 and 68 on the lower pivot shaft 26 with four other sprocket wheels 58, 60, 62 and 64 respectively on the medial pivot shaft 28. Each belt type endless connector could be a continuous link belt or sprocket chain. Preferably however, sprocket or roller chains are used for the parts of each belt type endless connector which contacts and passes over the sprocket wheels and metal rods are used for the remaining parts of said connectors. The sprocket chains are indicated by dotted lines c in Fig. 2 and the rods are indicated by solid lines r. The chains c and rods r are also shown in Fig. 8.

The larger sprocket wheel 68 on the lower pivot shaft 26 is non-rotatively supported, as previously explained. This sprocket wheel 68 is the same size as the sprocket wheels 63, 64 and 55 and the two belt type endless connectors 77 and 73 operate as deck leveling means on these sprocket wheels and always maintain the sprocket wheel 55 in a constant angular relation to the fixed sprocket wheel 68. The deck 30 is initially positioned with its bottom horizontal and said deck is non-rotatively connected with the sprocket wheel 55 through the shaft 31 and consequently the deck or cage 30 will always be held level irrespective of the inclined positions into which the two masts 24 and 25 are moved.

The connectors 76 and 72 operating over sprocket wheels 67, 62, 61 and 54 and over two of the jack shaft sprockets 50 and 51 are used to position a valve 80 which controls fluid pressure intake and exhaust relative to the hydraulic cylinder 43 by which the upper mast 25 is swingingly moved on pivot shaft 28.

The connectors 75 and 71 operating over sprocket wheels 66, 60, 59 and 53 and over two of the jack shaft sprockets 50 and 51 are used to position a valve 81 which controls "rotation" by controlling the supply of fluid pressure to the reversible hydraulic motor 23 by which the turntable 14 is moved.

The endless belt type connectors 74 and 70, operating over sprocket wheels 65, 58, 57 and 52 and over two of the jack shaft sprockets 50 and 51, are used to position a lower mast operating valve 82 which controls fluid pressure intake and exhaust relative to the double acting cylinder 32 by which the lower mast 24 is swingingly moved.

The valves 80, 81 and 82 along with other hydraulic control devices are shown diagrammatically in Fig. 10. For convenience these valves 80, 81 and 82, along with another valve 84 which controls the supply of fluid under pressure to a winch operating motor 85, are all shown as embodied in one valve housing 86. Obviously they may be separate and independent valves. The three valves, 80, 81 and 82, Figs. 2 and 10, are connected with the gearwheels 67, 66 and 65 respectively by three operating bars 87, 88 and 89, see also Fig. 7, and three levers 90, 91 and 92. Said three operating bars 87, 88 and 89 are further respectively connected by throw members 93, 94 and 95 with three manually operated levers 96, 97 and 98. A fourth lever 99 is connected by a throw member 99' with the valve 84 which controls the supply of fluid under pressure to the winch operating motor 85. The levers 96, 97, 98 and 99 make possible the manual operation of the valves 80, 81, 82 and 84, respectively, by a person standing on the rear end of the truck.

Three hand levers 100, 101 and 102, Fig. 2, are connected respectively with the sprocket wheels 54, 53 and 52 on the upper pivot shaft 31 so that a person on or in the deck or cage 30 can manually operate the valves 80, 81 and 82.

Limiting or safety devices, Figs. 2 and 8, are provided in connection with the means which controls the vertical swinging movement of the two masts 24 and 25. These safety devices operate by controlling the valves 80 and 82. The means for limiting the upward swinging movement of the lower mast 24 comprises a stop member 104 rigidly secured to the belt type endless connector 70 and a stop bracket 105 rigidly secured to the upper mast 25. At least one of the stop members 104 or 105 can be adjusted on the member to which it is secured.

The limiting or safety devices used in connection with the means for vertically swinging the upper mast 25 about the pivot 28 comprises a stop member 106 secured preferably to a rod r of the endless connector 72 and another stop member 107 secured to a leveling rod r of the belt type endless connector 73. The two stop members 106 and 107 are shaped and positioned so that they can contact each other. One way to accomplish this is to make the bracket 107 of angular shape with a part thereof positioned close to the connector 72 for abutment against the stop member 106. The stop members 106 and 107 are both rigidly secured to the parts by which they are carried but at least one of said stop members, for instance the stop member 107 is attached by screws 109 which can be loosened and the stop member adjusted along the connector 73.

Fig. 10 shows diagrammatically hydraulic control means embodied in this machine. This means includes the double acting hydraulic cylinders 32 and 43, the turntable rotating motor 23, the winch motor 85 and the control valve assembly 86 including valves 80, 81, 82 and 84. A hydraulic reservoir 110 is connected by a liquid conduit 111 with the intake of a pump 112. A pressure conduit from the pump 112, numbered 113, is connected by way of an outrigger control valve 114, a high pressure carry-over conduit 115 a rotatable hydraulic coupling 116 and another high pressure carry-over conduit 117 with the valve housing 86. The rotatable coupling 116 compensates for rotation of the turntable and maintains proper hydraulic communication between rotatably mounted parts and non-rotatably mounted parts without undesirable twisting of hoses by which these parts are connected.

The four valve members 80, 81, 82 and 84 are each capable of stopping and of reversing the flow of hydraulic fluid as respects the unit with which they are connected. One of these valves of a reciprocable type which will accomplish this purpose, namely the valve 82, is shown by way of illustration, in Fig. 11. This valve 82 is shown in a cylinder 118 in the housing 86. The cylinder 118 is communicatively connected by two conduits 119 and 120 with opposite end portions of the lower mast operating cylinder 32. Also the fluid pressure inlet conduit 117 is connected with the cylinder 118. When said valve 82 is in the lowered position shown in Fig. 11 fluid pressure from conduit 117 will pass to conduit 120 and thence to one end of the cylinder 32. At this same time the other end portion of said cylinder 32 will be communicatively connected with the reservoir 110 by way of conduit 119, valve passageway 121, conduit 122, coupling 116 and conduit 123. Upward movement of the valve 82 will first close the passageways to both conduits 119 and 120 thus shutting off intake and exhaust of the cylinder 32 and further upward movement of said valve 82 will reverse the previously described connections as respects the two ends of the cylinder 32. The valves 81, 80 and 84 may operate in a manner similar to the valve 82.

The valve 80 is connected by two conduits 124 and 125 with the upper mast cylinder 43, the valve 81 is connected by two conduits 126 and 127 with the hydraulic motor 23 which imparts rotation to the turntable and the valve 84 is connected by two conduits 128 and 129 with the winch operating motor 85.

The outrigger control valve 114 is connected by suitable conduits 130 with two hydraulic cylinders 131 and 132 which operate outrigger devices 133, one of which is shown in Fig. 1. The outrigger devices are used to give greater stability against sidewise tilting of the truck but are not part of this invention.

The larger sprocket wheel 68 on the shaft 26 which pivotally supports the lower end of the lower mast 24 is non-rotatively supported, as previously explained. The smaller sprocket wheels 65, 66 and 67 on this shaft 26 are free to rotate but ordinarily do not rotate when the lower mast 24 is angularly moved on pivot 26 because of the inertia and friction of the parts with which they are connected, including the valves in the valve housing 86. If the lower mast 24 is angularly moved about pivot 26 and the sprocket wheels on this pivot 26 do not move rotatively then there will be relative longitudinal movement between each of the endless belt type connectors and the masts. There will also be relative longitudinal movement between the connectors 73 and 77 which operate on the larger sprocket wheels and the other connectors which operate on the smaller sprocket wheels. These relative movements are utilized in controlling swinging movements about pivot members 26 and 28 of both of the masts 24 and 25.

The two masts 24 and 25 are rotatable with the turntable 14. When these two masts are parallel or near parallel and alongside of each other the deck 30 will be near the turntable axis and the center of gravity of the two masts and their load will be near enough over the truck to avoid instability. This is true even if the masts extend crosswise of the truck. If the lower mast 24 is approximately horizontal and the upper mast 25 is raised without moving the lower mast then obviously the center of gravity of the two masts and their load will be moved away from the axis of the turntable and may be moved outwardly to an unstable position. The stop members 106 and 107, as hereinafter explained, limit swinging movement of the upper mast 25 away from the lower mast 24, depending on the extent of upward incline of said lower mast and thereby cooperate in preventing instability. If the upper mast 25 could be moved into a substantially vertical position while the lower mast remained substantially horizontal the center of gravity of the two masts and load would be badly off-center. The stop members 106 and 107 cooperate in preventing such a condition.

If the lower mast 24 is generally upright or vertical then the upper mast can be generally upright or vertical without unbalancing the load. The stop members 104 to 107 inclusive permit a substantially vertical positioning of the two masts. If the lower mast 24 could be angularly moved downwardly from an upright position while the upper mast 25 remained substantially in alignment therewith then the center of gravity of the two masts and their load could be very rapidly shifted into an unstable or tipping position. The stop members 104 and 105 prevent such downward movement of the lower mast from an upright position until after there has been at least some pivotal movement of the upper mast downwardly about pivot 28 from its upright position.

In initially adjusting the two stop members 104 and 105 and the two stop members 106 and 107 the two masts 24 and 25 are raised into a substantially upright position, the two valves 82 and 80 are set in neutral and the two stop members of each pair are relatively adjusted so that they are in contact with each other. This establishes a condition of the control mechanism such that when the two masts 24 and 25 are subsequently brought back to this upright position the valves 82 and 80 will be moved to neutral and the masts 24 and 25 will be brought to a stop. In the above described upright position of the two masts and while the upper mast remains fully raised the connector 70 which carries the stop member 104 can not be moved by either the lever 102 or the lever 98 in the direction required to position the valve 82 for lowering the lower mast 24. This is because the stop member 104 on said connector 70 is against the fixed stop member 105. Under these conditions it is necessary to first begin to lower the upper mast 25 about pivot 28 and in so doing to start to move stop member 104 away from stop member 105 before any downward movement of the lower mast 24 about pivot 26 is possible. The amount of downward vertical movement from a vertical position which can be imparted to the lower mast 24 about pivot 26 before the stop member 104 contacts the stop member 105 and neutralizes the valve 82 will always be proportional to the amount of downward angular folding movement which has been imparted to the upper mast 25 about the pivot 28. Thus the stop members 104 and 105 and 106 and 107 limit pivotal movement of the two masts about pivots 26 and 28 in such a manner as to prevent these two masts from being moved into an unstable off-center position.

If the two masts are pivotally moved upwardly about the pivot 26 with no relative movement of said masts about pivot 28 then all of the endless belt type connectors in both masts will be moved longitudinally relative to the masts in the directions indicated by arrows X in Fig. 2. Downward pivotal movement of both masts about pivot 26 with no relative movement about pivot 28 will cause all of the connectors in both masts to be moved in the opposite direction. Angular movement of the upper mast 25 about pivot 28 away from the lower mast 24 will cause all of the connectors in the upper mast 25 to be moved in the directions indicated by the arrows Y. Angular movement of the upper mast toward the lower mast will cause all of the connectors in the upper mast to be moved in the opposite direction. Angular movement of the upper mast while the lower mast remains immovable will not longitudinally move any of the connectors in the lower mast.

The leveling connectors 73 and 77, being on sprocket wheels of larger diameter than the other connectors, will always move faster than the other connectors. Thus when the lower mast is raised and the upper mast moves with it but not relative to it the stop members 106 and 107 will both move in the direction indicated by the arrows X in Fig. 2 but the stop member 107 will move faster than the stop member 106 and will move away from the stop member 106. Pivotal movement of the upper mast 25 away from the lower mast 24 will move both stop members 106 and 107 in the direction indicated by arrows Y with the stop member 107 moving faster than the stop member 106 and thus in pivotal movement of the upper mast away from the lower mast the stop member 107 can contact the stop member 106 and by neutralizing the valve 80 stop the pivotal upward movement of the upper mast. The stop members 106 and 107 thus govern the upward swinging movement of the upper mast and the angular position of the lower mast helps to determine the point at which these stop members will contact each other because both of said stop members are also moved by swinging movement of the lower mast.

The foregoing description and accompanying drawings disclose a preferred embodiment of my invention but it will be understood that changes may be made within the scope of the following claims.

I claim:

1. In mast and mast control means, a frame; a lower and an upper end to end adjoining mast pivotally connected with each other and with said frame by two substantially horizontal parallel pivots; hydraulic mast operating devices connected with said masts supporting and moving the same; endless belt type connectors carried by said masts and connected with said hydraulic mast operating devices and movable relative to said masts in controlling said hydraulic mast operating devices; manually operated movement imparting means connected with said endless belt type connectors; and movement limiting safety devices connected with said endless belt type connectors and operated by pivotal movement of said masts limiting manual movement of said endless belt type connectors when said masts are in predetermined angular positions.

2. In mast and mast control means, a frame; a lower and an upper end to end adjoining mast pivotally connected with each other and with said frame by two substantially horizontal parallel pivots; hydraulic mast operating devices connected with said masts supporting and moving the same; valves controlling said hydraulic mast operating devices; endless belt type connectors carried by said masts and connected with said valves and movable relative to said masts in operating said valves and controlling said hydraulic mast operating devices; manually operated movement imparting means connected with said endless belt type connectors; and movement limiting safety stop devices connected with said movement imparting means and operated by pivotal movement of said masts limiting manual valve controlling movement of said endless belt type connectors when said masts are in predetermined angular positions.

3. In mast and mast control means, a frame; a lower mast; horizontal pivot devices pivotally connecting one end portion of said lower mast with said frame; an upper mast; horizontal pivot devices pivotally connecting the lower end portion of said upper mast with the upper end portion of said lower mast; a deck; horizontal pivot devices pivotally supporting said deck from the upper end portion of said upper mast, said three horizontal pivot devices being parallel; two hydraulic mast moving cylinders connected with the upper and lower mast respectively; a valve controlling the supply of fluid to each of said cylinders; endless belt type deck leveling means extending between the pivot devices at the lower end of the lower mast and the pivot devices supporting said deck; endless belt type valve operating means connected with the valve which controls the supply of fluid pressure to the upper mast moving cylinder both of said endless belt means being longitudinally moved by pivotal movement of said upper mast relative to said lower mast; a stop member rigid with said endless belt type deck leveling means; and another stop member rigid with said endless belt type valve operating means positioned in the path of said first mentioned stop member and limiting pivotal movement of at least one of said masts when it is engagement with said first mentioned stop member.

4. The apparatus as claimed in claim 3 in which the endless belt type deck leveling means operates over leveling sprocket wheels one of which is concentric with the pivot member at the lower end of the lower mast and is non-rotatively connected with the frame and another of which is concentric with the deck supporting pivot member at the upper end of the upper mast and is non-rotatively connected with the deck, and in which the endless belt type valve operating means is positioned alongside of the endless belt type leveling means and operates over sprocket wheels which are smaller than the leveling sprocket wheels and coaxial with said leveling sprocket wheels, whereby pivotal movement of the masts provides longitudinal movement at different speeds of the two endless belt type connectors in bringing the stop members on said connectors into limiting engagement with each other.

5. In mast and mast control means, a frame; a lower mast; horizontal pivot devices pivotally connecting one end portion of said lower mast with said frame; an upper mast; horizontal pivot devices pivotally connecting the lower end portion of said upper mast with the upper end portion of said lower mast; a deck; horizontal pivot devices pivotally supporting said deck from the upper end portion of said upper mast, said three horizontal pivot devices being parallel; sprocket wheels on each of said horizontal pivot devices; two hydraulic mast moving cylinders connected with the upper and lower mast respectively; a valve controlling the supply of fluid to each of said cylinders; endless belt type deck leveling means extending between the sprocket wheels at the lower end of the lower mast and the sprocket wheels on the pivot devices supporting said deck; endless belt type valve operating means positioned alongside of said endless belt type deck leveling means and connected with the valve which controls the supply of fluid pressure to the upper mast moving cylinder, both of said endless belt means being longitudinally moved by pivotal movement of the upper mast relative to the lower mast; a stop member attached to said endless belt type deck leveling means; another stop member attached to said endless belt type valve operating means and positioned in the path of said first mentioned stop member limiting pivotal movement of at least one of said masts when it is in engagement with said first mentioned stop member; a second endless belt type valve operating means carried by said masts and connecting with the valve which controls the supply of fluid pressure to the lower mast moving cylinder and longitudinally movable relative to the masts by pivotal movement of the lower mast; and two lower mast stop members respectively secured to one of said masts and to said second endless belt type valve operating means, whereby engagement of said lower mast stop members will limit swinging movement of said lower mast in one direction.

6. In mast and mast control means, a frame; a lower mast; horizontal pivot devices pivotally connecting one end portion of said lower mast with said frame; an upper mast; horizontal pivot devices pivotally connecting the lower end portion of said upper mast with the upper end portion of said lower mast; a deck; horizontal pivot devices pivotally supporting said deck from the upper end portion of said upper mast, said three horizontal pivot devices being parallel; two hydraulic mast moving cylinders connected with the upper and lower mast respectively; two valves positioned adjacent the pivot devices which connect the lower mast with the frame and controlling the supply of fluid under pressure to the respective mast moving cylinders; two endless belt type connectors extending throughout substantially the entire length of both of said masts valve operating means connecting said endless belt type connectors with the respective valves; and levers at the upper end of the upper mast providing movement of said endless belt type connectors in operating said valves.

References Cited in the file of this patent

UNITED STATES PATENTS

| | | |
|---|---|---|
| 2,500,815 | Gerli et al. | Mar. 14, 1950 |
| 2,616,768 | Stemm | Nov. 4, 1952 |